Jan. 24, 1928.
F. X. LAUTERBUR
1,657,264
LIQUID MEASURING AND TEMPERING DEVICE
Filed June 25, 1923
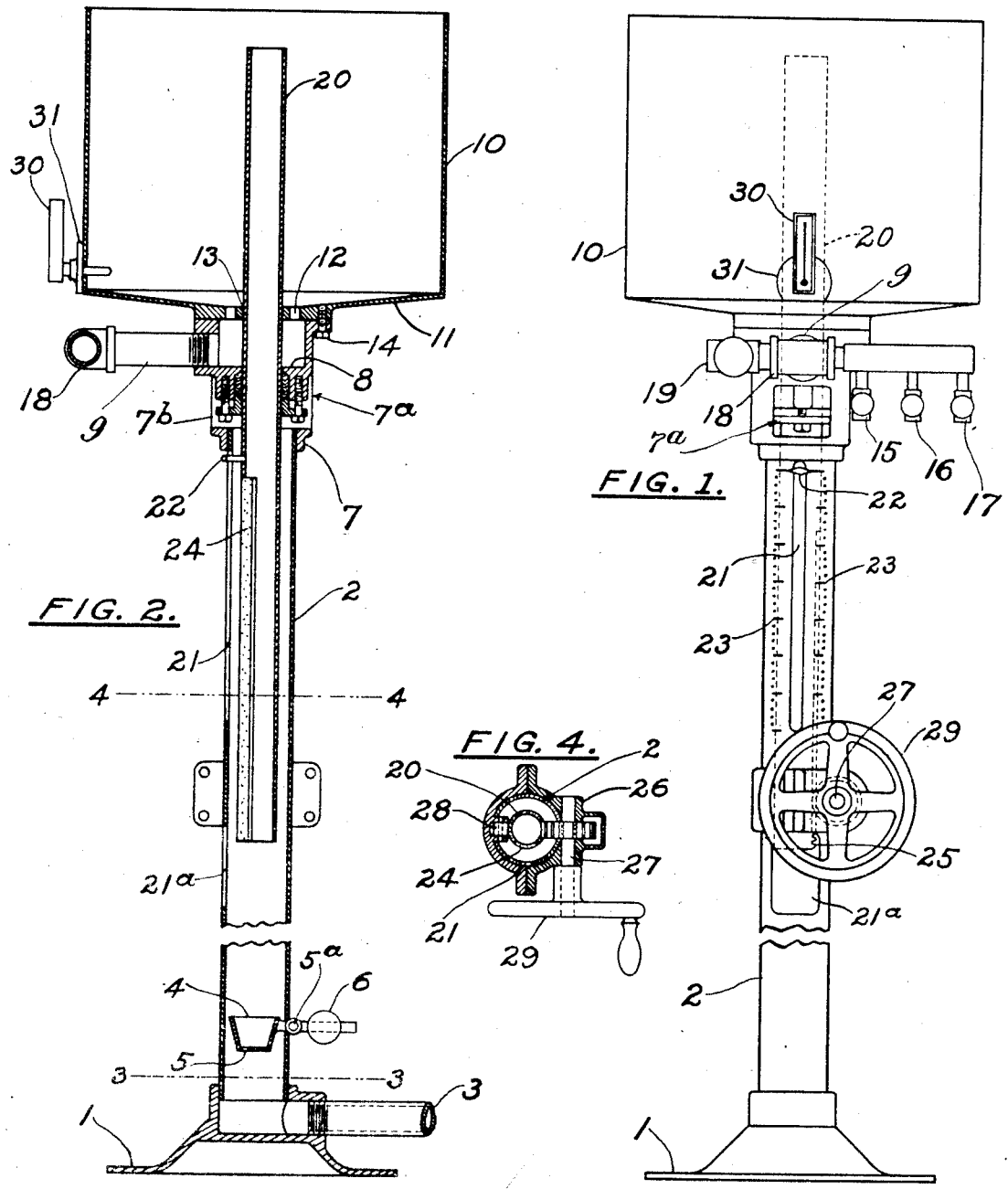
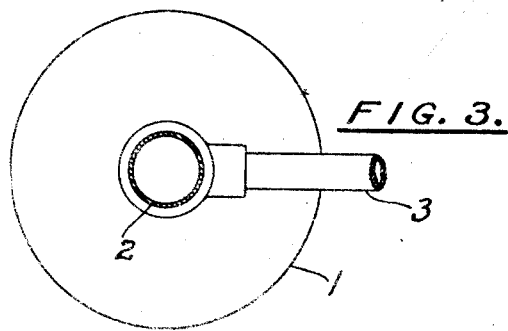
INVENTOR:
Frank X. Lauterbur,
BY
*Allen F Allen*
HIS ATTORNEYS.

Patented Jan. 24, 1928.

1,657,264

UNITED STATES PATENT OFFICE.

FRANK X. LAUTERBUR, OF SIDNEY, OHIO.

LIQUID MEASURING AND TEMPERING DEVICE.

Application filed June 25, 1923. Serial No. 647,493.

My invention relates to devices for use in the measuring, dispensing, and tempering or mixing of liquids, and has its principal application to devices having such functions, now used by bakers and cooks, and known as tempering tanks.

The tempering tank in the bakery consists essentially in a liquid containing vessel located high enough from the floor, upon which the dough mixing machines and the like are mounted, to drain by gravity into the said machines. In such a tank the baker measures off the quantity of water or other liquid which he proposes to use with a batch of dough or the like, and by means of a thermometer and some heating and cooling medium, brings the liquid to the temperature necessary for its best action. He then drains the quantity desired by gravity from the tank.

The usual tempering tank is equipped with a sight gauge and with a thermometer, but due to the fact that the tank must be at an elevation, it often happens that the gauge is read incorrectly, so much so that tempering tanks have been devised with automatic scales which control the quantity of liquid in the tank by shutting off the inflow thereto, when a predetermined weight of liquid has been run in.

It is the object of my invention, in its more specific application, to provide a tempering tank which has a simple means for predetermining the quantity of liquid with which it is to be filled, which device is easily readable from a point convenient to the operator. It is also my object to control the quantity of liquid in such a way that steam, hot water and cold water or other liquids may be introduced into the tank to bring about a desired condition of temperature or quality to the liquid therein without affecting the measured quantity of liquid which can be dispensed therefrom.

In this connection I provide a pipe which slides within the tank, this pipe being an overflow or drain pipe with the height to which its port reaches above the level of the base of the tank being readable on a gauge, over which a pointer carried by the pipe moves. This pipe is not necessarily used for dispensing the liquid, but preferably another port from the tank will be used for this purpose, and any change in level from the point predetermined by the raising of the outflow pipe port, will merely cause the excess created to flow out of the pipe keeping the level and hence the quantity to be dispensed, the same.

Thus it is evident that the mechanism of my device can be made very simply, and has application to a wider range in the arts, although certain of its advantages as will be obvious are inherent in its use as a tempering tank for the baker and cook.

I accomplish the objects set forth above and other advantages to be noted by that certain construction and arrangement of parts to be hereinafter more specifically pointed out and claimed.

In the drawings:

Figure 1 is a front elevation of the device.

Figure 2 is a vertical section taken through the center of the device at right angles to Figure 1.

Figure 3 is a cross section on the line 3—3 of Figure 2.

Figure 4 is a section taken horizontally through the standard and adjustable pipe structure, as at the line 4—4 of Figure 2.

The device in the embodiment selected for purposes of illustration has a base 1, and a hollow standard 2. In the base so located as to lead out from the hollow standard, is a drain fitting 3, so that liquid in the standard may flow away to any desired point, such as a waste water drain.

If desired a service water cut-off device may be provided and located in the standard near the base. As an illustrative showing of such a device I have illustrated a cup 4 having a bleed hole 5, which cup is mounted on a rock shaft 5ª set in the standard. A counterweight 6 for the cup is provided, and some sort of an electric switch (not shown) will be operated by the shaft in rocking, when the cup has become filled with overflow liquid so that with the upward tilting of the rock shaft a switch may be closed. An electric device of desired type for automatically closing a valve on the service supply line may thus be controlled.

At the head of the standard, which in the form shown is a cylindrical pipe, and may be sectional or not as desired, is a fitting 7, adapted to screw over the top end of the standard, this fitting having a web 8 across it, which provides for a gland 7ª. The fitting is open at 7ᵇ to give access to the gland nuts. Above the web 8, the fitting is formed in cup shape, and has preferably a single port therein, into which is inserted a pipe 9. The slidable overflow or drain pipe slides within the fitting 7, its joint being packed by the gland, and the liquids which are to run into the tank come in through the pipe 9.

The tank I have shown at 10, having a sloping base 11, is provided at its lower central portion with a series of ports 12, and a central opening 13 for the slidable overflow pipe. The fitting 7 bolts to the base of the tank by means of the bolts 14, thereby supporting the tank on the standard and at the same time providing for the outflow and inflow of water or other liquid thereto.

The pipe connections to the tempering tank, are one branch pipe, having a chilled water valve 15, a regular service water valve 16, and a hot water or steam valve 17. These connections serve the tank through one side of the T 18, that is fitted to the part 9, and on the other side of this T is the dispensing outlet pipe and valve 19.

I have shown the overflow pipe at 20, extending down through the standard and up through the fitting 7, and the tank base into the tank. The standard is cut away in slots 21 and 21ª, so as to expose the pipe 20, and mounted on the pipe at the selected point is an indicator device 22 in the form as shown of a T-shaped member, which is screwed into the pipe and moves along the outside of the standard, with its body within the slot 21 in the standard. A scale, indicated at 23, is formed on the standard to co-operate with the indicator, which is set and the scale arranged to indicate how many gallons or pounds of liquid are in the tank at any given setting of the overflow pipe, since all liquid above the overflow pipe will drain away at once, when the tank is filled.

The pipe is cut away along one side and a curved piece of glass inserted in recessed edges of the cut away portion with cement for holding the glass in place, as indicated at 24, so that looking through slots 21 or 21ª in the standard the operator can see when liquid begins to flow out through the said pipe.

To operate the pipe I preferably cut in the face thereof opposite to the indicator, which indicator, it will be noted keeps the overflow pipe against revolution within the standard, a rack 25, by means of which the pipe is operated. By means of a suitable support 26 I mount on the side of the standard well below the tank, a shaft 27 having a pinion thereon which extends in through a hole in the standard and engages the rack cut in the overflow pipe. If desired, on the other side of the pipe from the pinion I may mount a bearing roller 28, to make and provide a steadier operation for the rack and pinion.

A hand wheel 29 on the shaft provides means for operation thereof, and the user merely revolves the hand wheel until the overflow pipe indicator device shows the number of gallons or other measure desired in the tank. He then will turn on the service water valve for example, and fill the tank until he observes liquid running out through the overflow pipe.

By means of a thermometer 30 set in through a suitable fitting 31 in the side of the tank, the user can then read the temperature of the liquid. He can thereupon run in hot water, cold water, steam or what not, until the desired temperature is reached whereupon the excess of liquid in the tank will run out through the overflow pipe, leaving the total quantity remaining the same.

If desired, to approximate the correct temperature in the first place, any one of the valves at the inlet end of the device may be turned on, with the cup chamber above the web 8 operating together with the ports in the base of the tank as a mixer, to send a uniformly heated or chilled liquid into the tank.

When the water is tempered and ready for use, the user then turns open the outflow valve and by draining the tank therethrough the exact quantity noted on the gauge will be run by gravity into his mixer, or batch of materials he may wish to moisten. In this connection it should be noted that the tank may have an ordinary level gauge upon it, if desired, as my structure would not interfere with this.

As a simple gravity measuring device and dispensing device, the structure shown is completely adequate, and in the tempering tank art it possesses those valuable features over such devices, as used in the past, which have already been indicated.

Having thus described my invention, what I claim as new and desire to secure by Letters Patent, is:—

1. A tempering tank for the purposes described comprising an elevated tank, a slidable level-controlling overflow pipe extending into said tank, an inflow and outflow connection for the tank having suitable valves for control of same, the inflow connection having independent connections for liquids of varying temperatures, whereby the level of liquid in the tank can be controlled during the operation of adjusting the temperature thereof.

2. A tempering tank for the purposes described comprising an elevated tank, a slidable level-controlling overflow pipe extending into said tank, an inflow and outflow connection for the tank having suitable valves for control of same, the inflow connection having independent connections for liquids of varying temperatures, whereby the level of liquid in the tank can be controlled during the operation of adjusting the temperature thereof, and means disposed below the overflow pipe adapted to indicate the overflowing of liquid from the tank, said means comprising a bucket having a bleed hole in the bottom thereof, and a rocking arm on which said bucket is carried.

FRANK X. LAUTERBUR.